No. 734,904. PATENTED JULY 28, 1903.
W. J. LINTON.
CONTROLLER FOR HYDRAULIC AIR COMPRESSORS.
APPLICATION FILED DEC. 5, 1900.
NO MODEL.
FIG.1.
FIG.2.
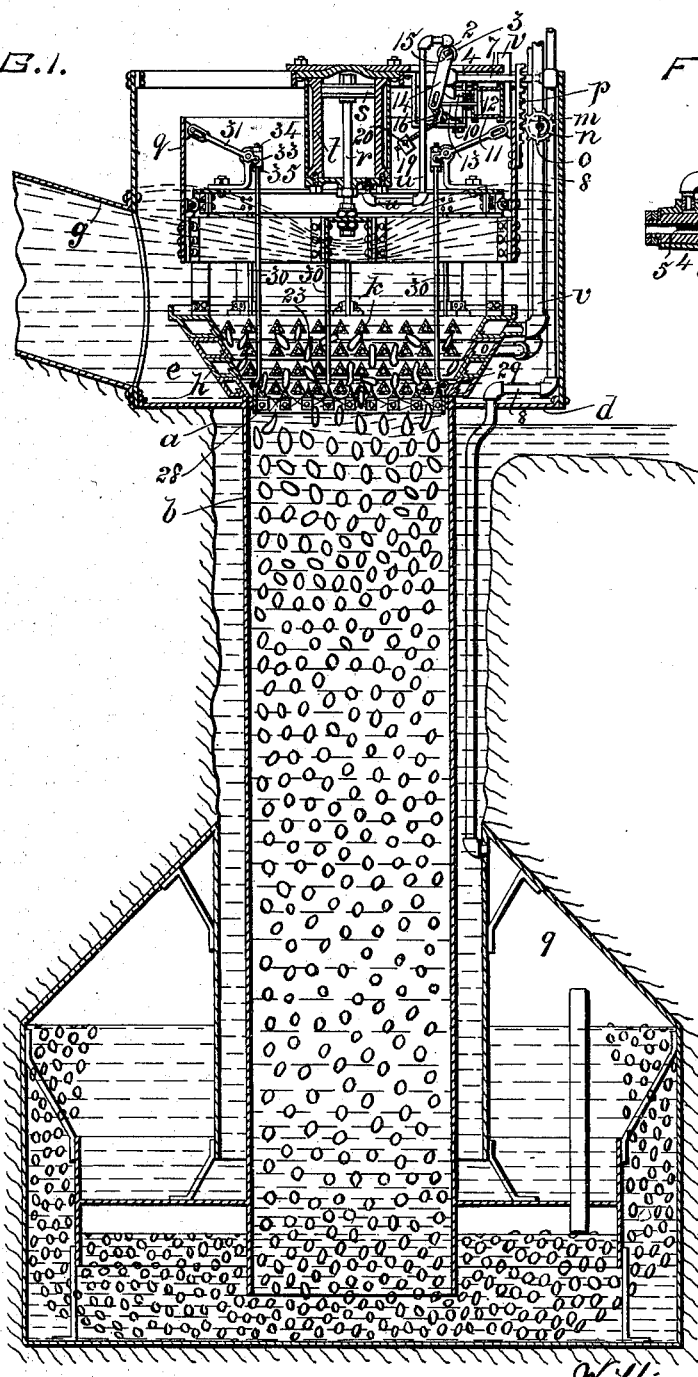
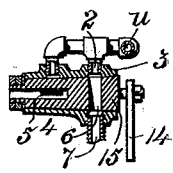
Witnesses
R.A.C. Kimber
William J. Linton
Inventor
By his Attorney
John N. Swan
THE NORRIS PETERS CO., PHOTO-LITHO., WASHINGTON, D. C.

No. 734,904.

Patented July 28, 1903.

UNITED STATES PATENT OFFICE.

WILLIAM JOHN LINTON, OF WOODSTOCK, CANADA, ASSIGNOR TO THE TAYLOR HYDRAULIC AIR COMPRESSING COMPANY, LIMITED, OF MONTREAL, CANADA, A CORPORATION OF CANADA.

CONTROLLER FOR HYDRAULIC AIR-COMPRESSORS.

SPECIFICATION forming part of Letters Patent No. 734,904, dated July 28, 1903.

Original application filed February 21, 1900, Serial No. 6,044. Divided and this application filed December 5, 1900. Serial No. 38,849. (No model.)

*To all whom it may concern:*

Be it known that I, WILLIAM JOHN LINTON, of the town of Woodstock, in the county of Oxford and Province of Ontario, Dominion of Canada, have invented certain new and useful Improvements in Controllers for Hydraulic Air-Compressors; and I do hereby declare that the following is a full, clear, and exact description of the same.

My invention relates particularly to hydraulic air-compressors of the type described in my pending application filed February 21, 1900, under Serial No. 6,044, of which this is a divisional part and wherein the air is conducted to a separating or compressing chamber by a descending body of water.

My present invention may be said to consist in providing means for regulating the power of compression of an hydraulic air-compressor to a predetermined normal.

More specifically speaking, the invention consists of means automatically actuated through the medium of the air under compression in the separating-chamber, when it varies from a predetermined normal pressure, for controlling the volume of water supplied to the stand-pipe and the quantity of air supplied to the falling water.

I have found my present invention particularly useful where the water-supply available is being utilized as a source of power to drive several other plants and where the unnecessary use of the water by any one plant is to the disadvantage of the other plants.

For full comprehension, however, of my present invention reference must be had to the accompanying drawings, forming a part of this specification, in which in Figure 1 a hydraulic air-compressing plant with my present invention applied thereto is illustrated in vertical sectional view, and in Fig. 2 a detail sectional view of my three-way valve is shown.

$a$ is the shaft, and $b$ the stand-pipe. The upper end of the stand-pipe $b$ projects a short distance above the floor $d$ of the cylindrical water-receiving chamber $e$, and this chamber $e$ is connected to the dam (not shown) by a flume $g$. A series of hollow annular sections $h$ are superimposed one upon the other and collectively form an extension to the upper end of the stand-pipe. The lower inner edge of each series of horizontally-arranged bars $k$ of inverted-V cross-section are secured in correspondingly-shaped openings in the inner wall of each of these sections $h$, and an air-supply pipe $v$, communicating at its lower end with the interior of each of said hollow annular sections, leads therefrom upwardly and is closed at its upper end. Each of these pipes has a lateral extension $m$ near the upper end thereof, and a damper $n$ to control an opening therein, the function of these dampers being to regulate the draft of air through the pipes $v$, and each damper is automatically operated by a pinion $o$, formed in one therewith and rotated by a rack $p$, to be further alluded to. A vertically-movable cylindrical section $q$ at times rests upon the top of the uppermost section $h$ and is of a height to (when resting upon said uppermost section) have its upper edge extend above the highest water-level attainable in the dam. This cylindrical section $q$ constitutes a valve for controlling or cutting off completely the flow of water into the stand-pipe, and for actuating this valve to this purpose I connect the piston-rod $r$ of a piston $s$ in a cylinder $t$ to the said valvular cylindrical section $q$. The vertical rack $p$, before mentioned, is rigidly secured to the cylindrical section $q$ adjacent to each damper-pinion $o$, with which it intermeshes. The lower end of the interior of this cylinder $t$ is in communication through a pipe $u$ with one, 2, of the ports in the casing 3 of a three-way valve 4, the other two ports 5 and 6 whereof communicate, respectively, with the atmosphere and with a T-pipe, one branch, 7, whereof is connected to a pipe 8, leading from the separating-chamber 9, and the other branch, 10, to one end of a horizontal cylinder 11. A piston 12 is located within this cylinder 11 and is connected by a piston-rod 13 and a lever 14 to the stem of a rotatable plug-valve 15 for controlling the ports of said casing 3. The outer end of the piston-rod 13 is connected also to one arm, 16, of a bell-crank lever, the other arm, 19, whereof is graduated in the form of a beam and carries an adjustable counterpoise 20. In order to assist said valvular cylinder in its control of the volume of water to pass through the stand-pipe, I provide a ring 28, fitting within the upper end of the stand-pipe and having secured rigidly thereto a series of horizontally-arranged bars 29 of triangular cross-section with concave upper sides. The upper edges of these bars 29 extend parallel to and are located between the bars $k$. This controller is supported by four rods 30, each pivotally and adjustably hung from one end of a lever 31, the other end of which is pivotally connected to the interior of the cylindrical valvular section $q$. The pivotal adjustable connection between the inner ends of these levers 31 and the rods 30 is effected by means of a sleeve 33, pivotally connected to said inner ends, which are forked, while the upper ends of the rods 30 are screw-threaded and passed through these sleeves and have localizing-nuts 34 and jam-nuts 35 therein, these rods being pivotally connected at their lower ends, as at 36, to the ring 28. By this connection the rods, and through them said augmental controller, can be adjusted to either almost completely close the spaces between the lower series of bars $k$ when the valvular section $q$ is at its extreme height or to leave a space such as shown.

By means of the above construction the bars 29 will be automatically moved toward or away from the air-bars $k$, thereby diminishing or increasing the space for the passage of the descending water between said bars as the volume of water decreases or increases and at the same time causing said water to as nearly as possible envelop the open lower side of the lower series of said bars, and the rise and fall of this valvular cylindrical section $q$ will through the racks and pinions automatically open and close the controlling-valves of the air-supplying pipes.

The separating-chamber is and may be of the construction illustrated in my above-mentioned pending application, of which this is a divisional part; but such type is illustrated herein for the sole purpose of showing the operative relation between the air under compression in the compression-chamber 9 and my improved controller.

The operation of my improved controller is as follows: The air-charged water, as usual, descends the stand-pipe $b$, the air is separated therefrom and retained in the compression-chamber, and the water rises in the shaft and flows away. It must first be ascertained what working pressure is necessary to supply the power required for the work to be done by the plant. It is obvious that any power generated more than is necessary for the work to be done is superfluous and waste energy. Consequently limiting the generating power of the plant to the work to be done will obviate this waste of energy and allow it to be utilized for other purposes. Let it be supposed that a normal working pressure of ninety pounds is required. The counterpoise 20 should then be moved along the beam 19 to the corresponding mark thereon. As the pressure of air in the pipe 8, leading from the separating-chamber, overcomes the weight of the valvular cylindrical section $q$, the piston $r$, and the intermediate connections therebetween such parts will be raised to the position shown and the full volume of water allowed to descend. If, however, the pressure in pipe 8 exceeds ninety pounds, the counterpoise 20 will be overcome and the piston 12, and with it the lever 14, of the three-way valve moved. This will cut the communication between the pipe 8 and the cylinder $t$ and establish a communication between said cylinder $t$ and the exhaust-port of the three-way valve, thereby allowing the valvular cylindrical section $q$ to fall and cut off the water and air supply until normal pressure within the plant is restored, after which the valve $q$ will be again lifted and the air-valves opened, as before mentioned.

When the compressor is being constructed, the valvular cylindrical section $m$ is supported by any suitable means (not shown) that can be easily removed after operation has commenced.

Other specific means than that illustrated may be employed without departing from the spirit of my invention.

The specific means herein illustrated for admitting the air and water, controlling the admission thereof, and separating one from the other are not herein specifically claimed, as they form the subject-matter of the before-mentioned pending application of which this is a divisional part; neither do I claim herein the system of separation of the air and water as forms the subject-matter of an application filed by me December 3, 1900, Serial No. 38,542.

What I claim is as follows:

1. In an air-compressor of the class described means for automatically controlling the air-supply to said compressor.

2. The combination with the air-supply pipes of a hydraulic air-compressor of the class described, of means for automatically controlling the passage of air through said air-supply pipes substantially as described.

In testimony whereof I affix my signature in presence of two witnesses.

WILLIAM JOHN LINTON.

Witnesses:
 WILLIAM P. McFEAT,
 FRED. J. SEARS.